United States Patent
Annamaa et al.

[11] Patent Number: 6,140,973
[45] Date of Patent: *Oct. 31, 2000

[54] SIMPLE DUAL-FREQUENCY ANTENNA

[75] Inventors: Petteri Annamaa, Oulu; Seppo Raatikainen, Kempele; Matti Niemi, Arkkukari, all of Finland

[73] Assignee: LK-Products OY, Kempele, Finland

[*] Notice: This patent issued on a continued prosecution application filed under 37 CFR 1.53(d), and is subject to the twenty year patent term provisions of 35 U.S.C. 154(a)(2).

[21] Appl. No.: 09/010,860

[22] Filed: Jan. 22, 1998

[30] Foreign Application Priority Data

Jan. 24, 1997 [FI] Finland ..................................... 970297

[51] Int. Cl.[7] ...................................................... H01Q 9/04
[52] U.S. Cl. .......................... 343/790; 343/895; 343/792; 343/725
[58] Field of Search ..................................... 343/790, 791, 343/792, 895, 702, 729, 725; H01Q 9/04

[56] References Cited

FOREIGN PATENT DOCUMENTS

| 0 718 909 A3 | 6/1996 | European Pat. Off. . |
| 2206243 | 12/1988 | United Kingdom . |
| WO 96/37007 | 11/1996 | WIPO . |

*Primary Examiner*—Don Wong
*Assistant Examiner*—Shih-Chao Chen
*Attorney, Agent, or Firm*—Darby & Darby

[57] ABSTRACT

An antenna construction comprises a feed conductor (11, 21) and an antenna element (12, 22, 24, 25, 26, 27) which has a first end and a second end. The feed conductor is substantially electrically unshielded and coupled to the antenna element at a tapping point (13, 23) located between the first end and second end of the antenna element the tapping point dividing the antenna element into two portions having unequal electrical lengths. The antenna element may be a helix (12), a whip (22) or another known two-ended antenna element or a combination of those.

11 Claims, 7 Drawing Sheets

SIMPLE DUAL-FREQUENCY ANTENNA

BACKGROUND OF THE INVENTION

The invention relates in general to antenna constructions in radio apparatuses. In particular the invention relates to an antenna construction which has two resonating frequences different from each other. This patent application uses a mobile phone as an example of a radio apparatus.

In different parts of the world there are cellular telephone systems in use that differ from each other significantly in their operating frequency ranges. Of digital cellular telephone systems, the operating frequencies of the Global System for Mobile Tele-communications (GSM) are 890–960 MHz, those of the Japanese Digital Cellular (JDC) system in the 800 and 1500 MHz bands, of the Personal Communication Network (PCN), 1710–1880 MHz, and of the Personal Communication System (PCS), 1850–1990 MHz. The operating frequencies of the American AMPS mobile phone system are 824–894 MHz and those of the Digital European Cordless Telephone (DECT) system, 1880–1900 MHz.

Since the resonating frequency of a prior-art radio-frequency antenna is in a known manner connected with the length of the antenna, through the wavelength, a certain antenna can be used only in a mobile phone designed for a cellular system of a certain frequency area. In some cases, however, it is desirable that one and the same phone could be used in some other frequency range, too. In addition to other suitable RF parts, a working antenna arrangement is then needed.

Figure 1:
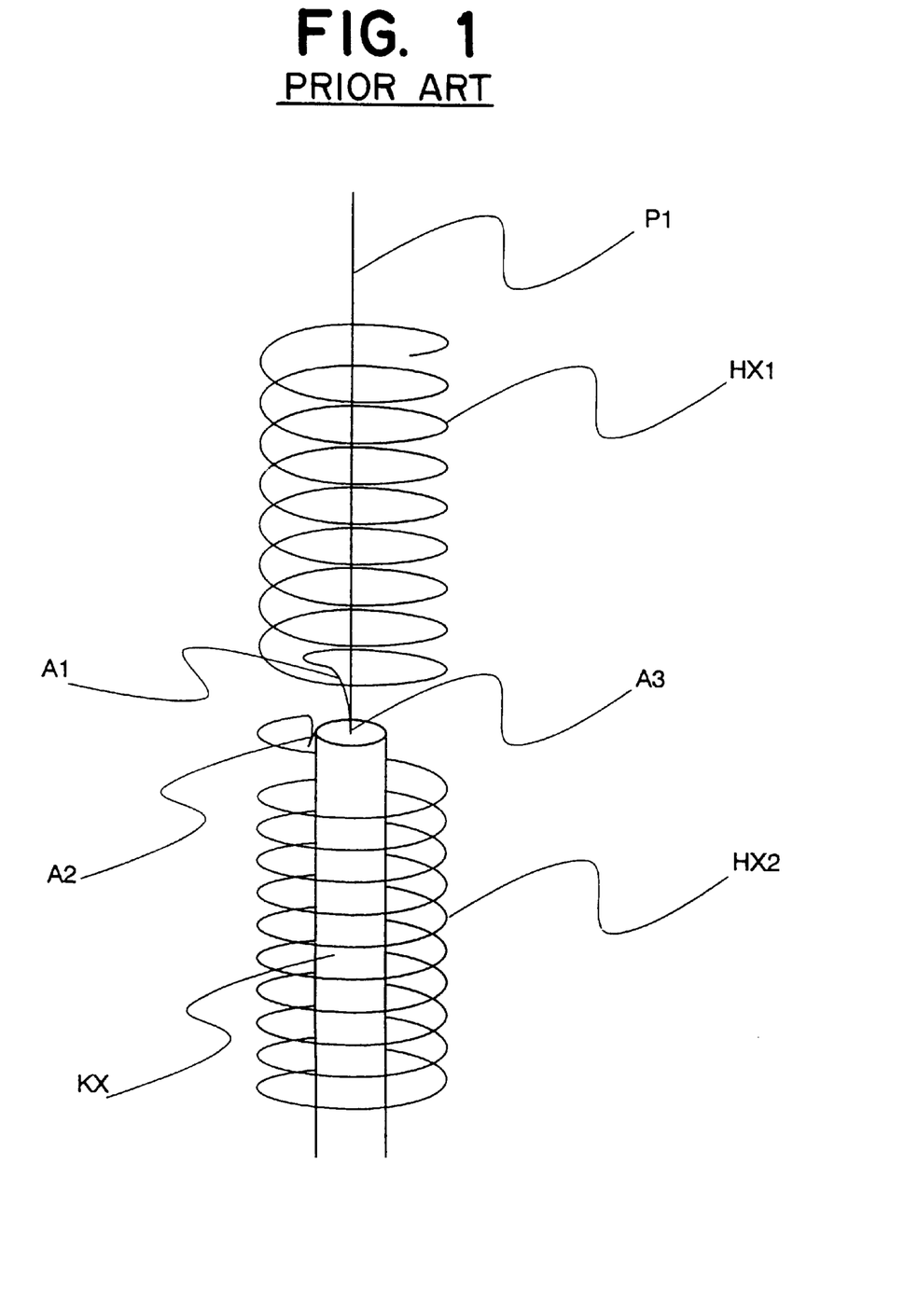
FIG. 1 shows an antenna construction according to the prior art.

U.S. Pat. No. 4,442,438 discloses an antenna construction resonating at two frequencies, substantially comprising, as shown in FIG. 1, two helixes HX1, HX2 and one whip element P1. The helixes HX1 and HX2 are positioned one after the other along the symmetry axis of the construction, and their adjacent ends A1 and A2 constitute the feed point of the combined construction. The whip element P1 is partly inside the upper helix HX1 extending to some extent outside it, and its feed point A3 is at its lower end. A RF signal is brought to the feed point A3 via a coaxial conductor KX coinciding with the symmetry axis of the construction and travelling through the lower helix HX2. The feed point A3 of the whip element is coupled to the lower end A1 of the upper helix, and the lower helix is coupled at its upper end A2 to the conductive and earthed shroud of the coaxial conductor KX. The construction's first resonating frequency is the resonating frequency of the combined structure of helixes HX1 and HX2; 827 MHz in the illustrative embodiment. The second resonating frequency of the construction is the common resonating frequency of the upper helix HX1 and the whip element P1; 850 MHz in the illustrative embodiment. Thus, helix HX1 and whip element P1 are dimensioned such that they have substantially the same resonating frequency.

The construction disclosed by the U.S. Patent is relatively complex. From the manufacturing standpoint, the most difficult part in the construction is the feed point arrangement at the middle of the antenna, where the lower end A3 of the whip element and the lower end A1 of the upper helix have to be galvanically coupled, and the lower helix has to be coupled at its upper end A2 to the shroud of the coaxial conductor feeding the whip element. According to the material presented in the patent the difference between the two resonating frequencies achieved by the construction is small because the upper helix HX1 and the whip element P1 have to be dimensioned such that they have substantially the same resonating frequency, so the construction cannot be applied to a phone operating at the GSM and PCN frequencies, for example. Indeed, in the description of the patent it is stated that an object of the invention is to broaden the resonating frequency area of the mobile phone antenna such that it would better cover the whole frequency range in one cellular system.

Figure 2:
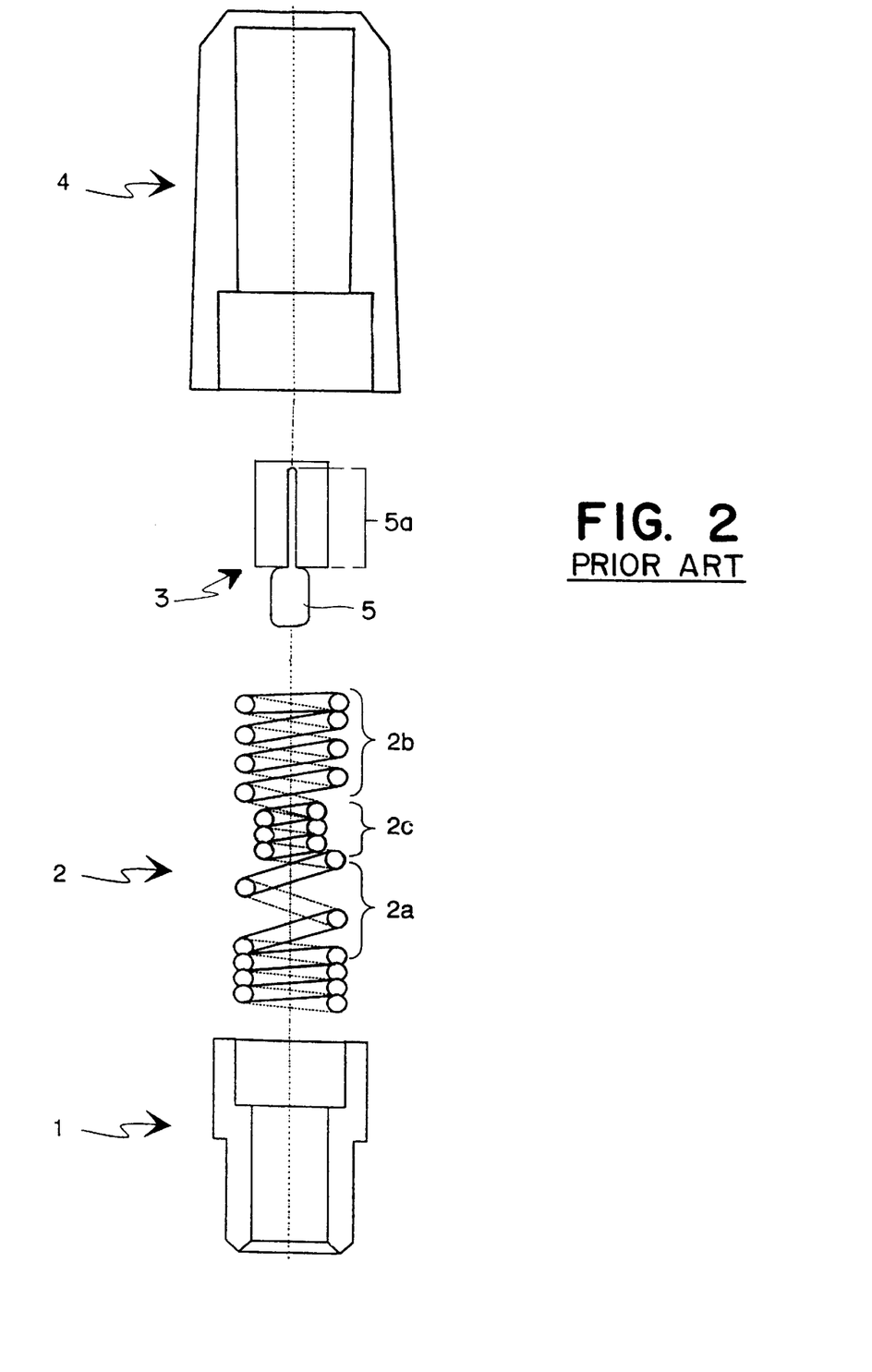
FIG. 2 shows a second antenna construction according to the prior art.

Finnish patent application FI 963275 (LK-Products) discloses a dual-frequency antenna construction according to FIG. 2 in which there is at a certain point between the ends of a helix antenna 2 wound into a cylindrical coil a coupling part 2c for the coupling to a second antenna element 3. The cylindrical coil conductor 2, which is the first antenna element in the antenna, comprises in the direction of its longitudinal axis a lower part 2a and an upper part 2b, and the second antenna element 3 is connected to the cylindrical coil conductor through a fixed coupling at the coupling point 2c between the lower and upper parts. The two radiating antenna elements of the construction have a common lower part up to the branching point consisting of the coupling part, from which point on the electrical lengths of the antenna elements are different. The first resonating frequency of the combined antenna construction is determined by the total electrical length of the common lower part of the antenna elements and the upper part of the first antenna element. The second resonating frequency is determined by the total electrical length of the common lower part of the antenna elements and the upper part of the second antenna element. In addition, the resonating frequencies are affected by the mutual coupling of the antenna elements and the fact that the antenna elements are electrically conductive bodies in the near fields of one another so that they put a load on each other. The antenna. construction according to FIG. 2 is relatively difficult to precisely dimension to the desired frequencies since the coupling point between the antenna elements requires quite accurate positioning. In addition, the electrical coupling in the coupling point easily becomes unreliable.

SUMMARY OF THE INVENTION

An object of this invention is to provide an antenna construction which can be applied in two operating frequency ranges and which is simple to manufacture and reliable in its operation. Another object of the invention is to provide an antenna construction which can be easily dimensioned to two different operating frequencies. A further object of the invention is that the antenna construction according to the invention is applicable to large-scale series production.

The objects of the invention are achieved by an antenna construction in which an antenna element comprises an upper and a lower end and a tapping point between them to couple a feed conductor to it, and in which the feed conductor can also function as part of a radiating antenna.

The antenna construction according to the invention is characterised in that the feed conductor in it is substantially electrically unshielded and is coupled to the antenna element at a tapping point which is located between the first end and second end of the antenna element and which divides the antenna element into two parts of unequal electrical lengths.

The antenna according to the invention has an antenna element which has a first end and a second end and a tapping point which is located at a certain point between the ends of the antenna element. The ends of the antenna element may also be called the upper and lower ends, in which case these names refer to the position in which antennas are usually depicted in technical drawings and do not limit the manufacture or use of the antenna according to the invention in any particular direction. The tapping point divides the antenna element asymmetrically such that the electrical length from the tapping point to a first end (advantageously the upper end) is considerably greater than the electrical length from the tapping point to a second end (lower end). The feed conductor of the antenna, which connects the antenna element electrically to a radio apparatus, is coupled to the antenna element at the tapping point. A noticeable difference between the arrangement according to the invention and the construction disclosed in the document U.S. Pat. No. 4,442,438, described above in conjunction with the description of the prior art, is that a substantial portion of the feed conductor also serves as a radiating part because the feed conductor is electrically unshielded (it has no shroud made of a conductive material around it). The total electrical length of the antenna construction at a first operating frequency is the sum of the electrical lengths of the feed conductor and the portion extending from the tapping point to the first end of the antenna element. Correspondingly, the total electrical length of the antenna construction at a second operating frequency is the sum of the electrical lengths of the feed conductor and the portion extending from the tapping point to the second end of the antenna element.

The antenna element mentioned above can be a cylindrical coil conductor, or helix, a straight conductor or a combination of those. Advantages of a cylindrical coil conductor include a small physical size in proportion to the electrical length, and versatile dimensioning possibilities (selectable length of helix wire, selectable diameter, selectable angle of helix). An advantage of a straight conductor is that it is easy to manufacture. Combined constructions can make use of the advantages of both antenna element types. Simple embodiments of the invention may include a movable whip element which the user can pull out to the extended position in order to enhance the antenna function or push inside the outer casing of the radio apparatus for transportation and/or storage.

BRIEF DESCRIPTION OF THE DRAWINGS

The invention is described in more detail with reference to the preferred embodiments, presented by way of example, and to the accompanying drawing wherein FIG. 3b shows a variation of the construction of FIG. 3a, FIG. 3a' shows the return loss as a function of frequency for the antenna of FIG. 3a, FIG. 3b' shows the return loss as a function of frequency for the antenna of FIG. 3b, FIG. 6a shows antenna constructions according to the invention with the movable part pushed in.

DETAILED DESCRIPTION OF THE INVENTION

Above in connection with the description of the prior art reference was made to FIGS. 1 and 2, so below in the description of the invention and its preferred embodiments reference will be made mainly to FIGS. 3a to 6b.

Figure 3A:
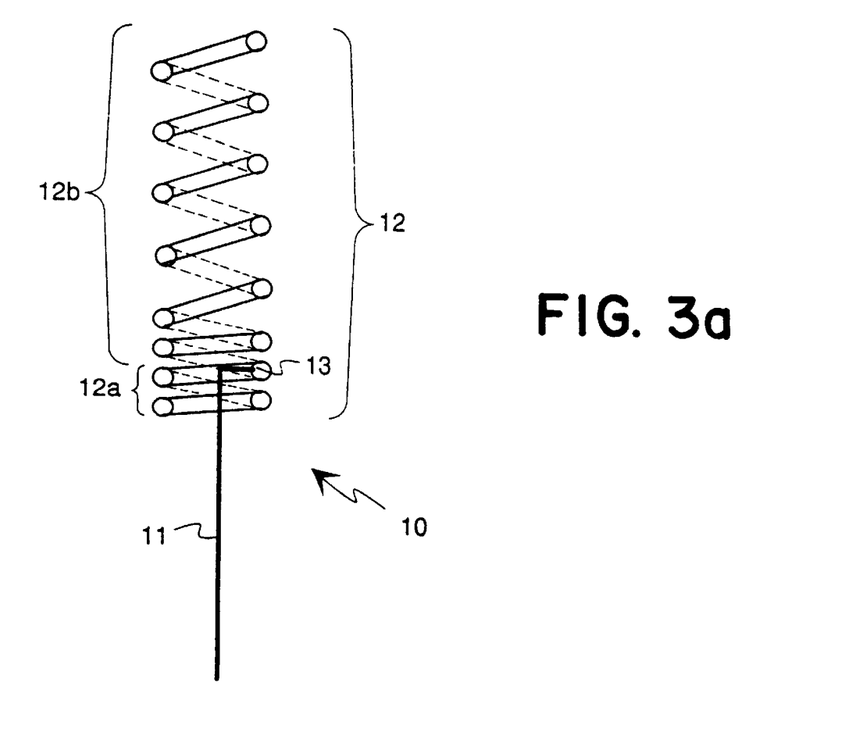
FIG. 3a shows an antenna construction according to the invention.
Figure 3B:
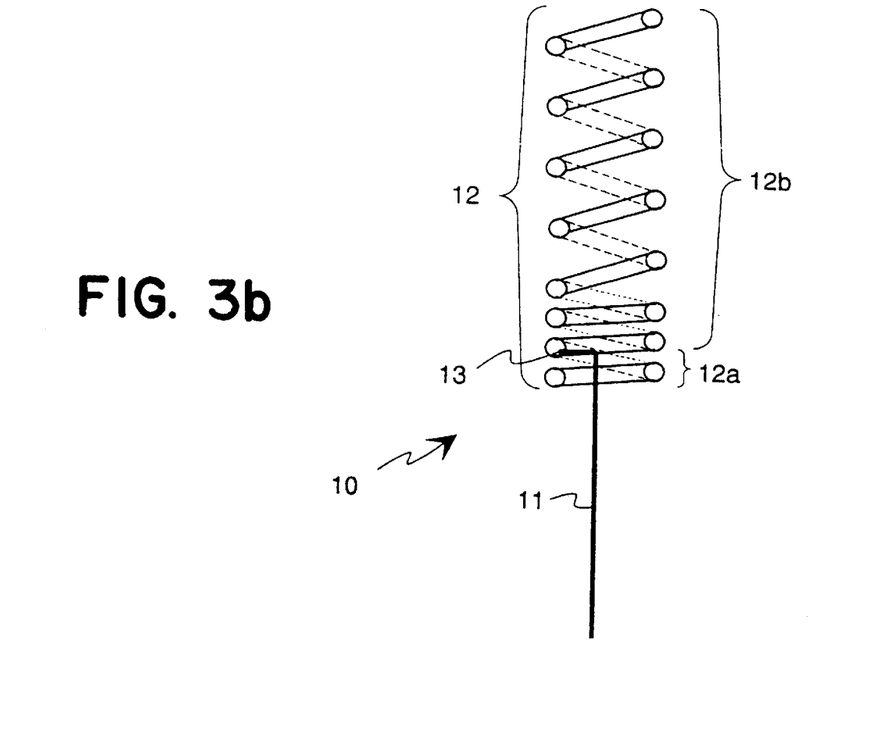

FIGS. 3a and 3b describe two variations of an antenna construction according to a preferred embodiment of the invention. An antenna 10 comprises a feed conductor 11, which is substantially unshielded, and a cylindrical coil conductor, or helix 12, which is tapped (coupled) to said feed conductor at a certain tapping point 13. The tapping point 13 divides the helix into a lower part 12a and upper part 12b. From the antenna dimensioning and operation standpoint, the crucial parameters are the number of turns in the lower part 12a and upper part 12b of the helix, the location of the tapping point 13 and the length of the feed conductor 11. The operating frequencies of the antenna are determined by the dimensioning of the helix 12 and conductor 11 in proportion to the location of the tapping point 13. In the embodiment of FIGS. 3a and 3b the upper part 12b of the helix is clearly longer than the lower part 12a so that the lower operating frequency of the antenna is determined by the number of turns in the upper part 12b and the length of the feed conductor 11. Correspondingly, the higher operating frequency of the antenna is determined by the number of turns in the lower part 12a and the length of the feed conductor 11.

The feed conductor 11 is unshielded for the portion shown in FIGS. 3a and 3b so as to function as a radiating part when radio-frequency oscillation is fed to the antenna via the lower end of the feed conductor (and as a resonating part when the antenna receives radio-frequency oscillation from its environment). The invention does not limit the length of the unshielded portion, and particularly not the construction or dimensioning of the feed conductor in so far as it does not function as a radiating part. However, the suitability of the construction for certain operating frequency areas must be taken into account in the dimensioning of the unshielded part in the manner described later on.

In FIG. 3a, the lower part 12a of the helix below the tapping point 13 comprises 1.25 turns. In the variation shown in FIG. 3b, the helix and the feed conductor are the same but the tapping point is lower in the helix, so that only 0.75 turns remain below the tapping point. Since the antenna part radiating at the higher frequency is shorter in FIG. 3b, the higher operating frequency of the antenna in FIG. 3b is higher with the antenna of FIG. 3a. By selecting the number of turns in the lower part of the helix as desired it is possible to select the frequency range of the PCN or PCS system, for example, as the higher operating frequency range. The length of the helix part 12b above the tapping point can be selected such that the lower operating frequency then matches the AMPS or GSM system, for instance. Table 1 shows by way of example dimensions for antennas according to FIGS. 3a and 3b wherein suitable values of helix length and tapping point location produce antennas applicable in the GSM/PCN or AMPS/PCS systems. The table shows that in the AMPS/PCS system the total length of the helix is half a turn longer and the tapping point half a turn lower than in the GSM/PCN system. A helix of a certain length can be easily adapted by shortening and/or moving the tapping point such that antennas are obtained for several different systems.

TABLE 1

| Systems: | GSM/PCN | AMPS/PCS |
|---|---|---|
| Length of feed conductor 11 | 26 mm | 26 mm |
| No. of turns in lower part 12a of helix | 1.25 | 0.75 |
| No. of turns in upper part 12b of helix | 4 | 5 |
| Diameter of helix 12 | 6.5 mm | 6.5 mm |
| Pitch of turns in lower part 12a of helix | 0.4 mm | 0.4 mm |
| Pitch of turns in upper part 12b of helix | 2 to 6 mm (thinning) | 2 to 6 mm (thinning) |

The bandwidth around a certain nominal operating frequency that corresponds to the effective operation of the antenna is determined by the pitch in the lower part 12a and upper part 12b of the helix. As a rule, the more widely interspaced the turns, the broader the bandwidth, especially at the lower operating frequency. Dimensioning the antenna by selecting the lengths of the parts and the pitch in the helix element is advantageously carried out by experimenting and does not require inventive action. FIGS. 3a' and 3b' show measurement results for antennas according to FIGS. 3a and 3b. In the both cases, the curve represents parameter $s_{11}$ which is shown in decibels as a function of frequency. Said parameter describes the return loss, or that part of the signal which is reflected back to the radio transmitter that is transmitting the signal via an antenna connected to it. A low value of parameter $s_{11}$ at a given frequency means the antenna operates effectively at that frequency.

Figure 4A:
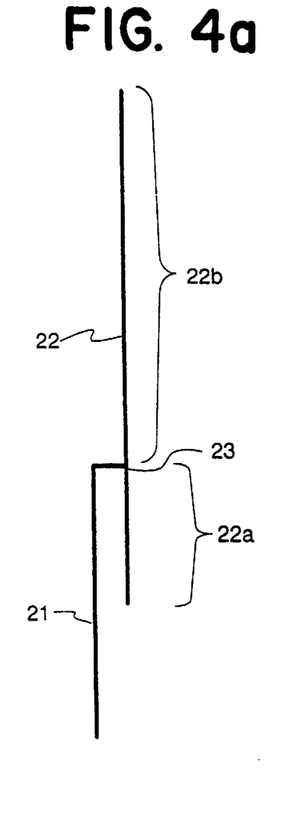
FIG. 4a shows a second antenna construction according to the invention.

FIGS. 3a and 3b showed an antenna construction in which the antenna element to be tapped is a helix. A similar construction can also be realised using a whip antenna or a combination antenna as the antenna element, in which case the operating principle is the same and the frequency selection is carried out in the same manner. FIG. 4a shows a construction wherein a dual-frequency antenna is realised as a whip antenna. In FIG. 4a, the helix 12 shown in the embodiments of FIGS. 3a and 3b is substituted by a straight conductor, or whip 22, to which a feed conductor 21 is coupled at a tapping point 23. The tapping point divides the whip into a lower part 22a and upper part 22b. The lower operating frequency is determined by the total electrical length of the feed conductor 21 and the upper part 22b of the whip, and the higher operating frequency is determined by the total electrical length of the feed conductor 21 and the lower part 22a of the whip.

Figure 4B:
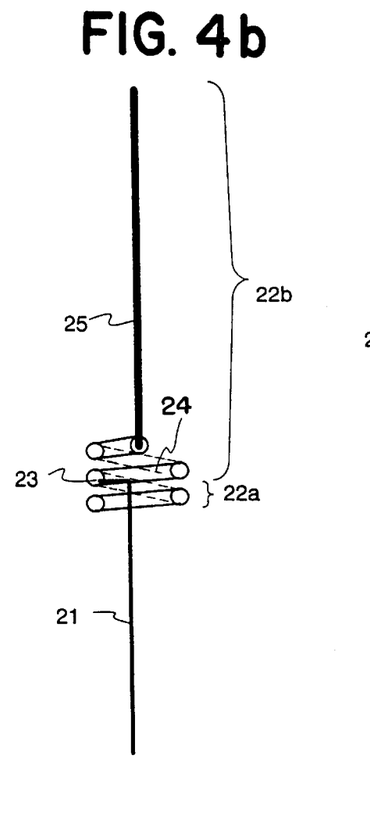
FIG. 4b shows a third antenna construction according to the invention.
Figure 4C:
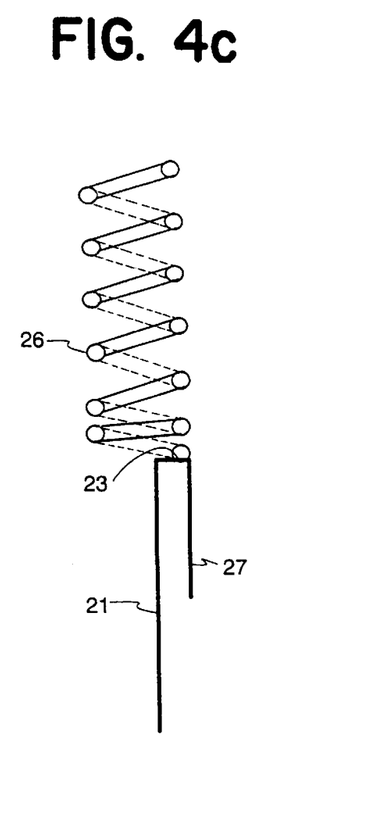
FIG. 4c shows a fourth antenna construction according to the invention.

A combination antenna refers to a construction in which the tapped antenna element is a combination of known simple antenna elements. In FIG. 4b the antenna element consists of a series connection of a helix 24 and a whip 25, wherein the tapping point 23 is located at a certain point of the helix 24. The upper part 22b of the antenna element comprises the portion of the helix 24 which is above the tapping point 23, and the whip 25 which extends from it; and the lower part 22a of the antenna element comprises the portion of the helix 24 which is below the tapping point 23. In the construction of FIG. 4c the upper part of the antenna element consists of a helix 26, the tapping point 23 is at the lowest point of the helix, and the lower part of the antenna element consists of a whip 27 extending downwards from the tapping point. From the manufacturing standpoint it is advantageous to form the whip portion for such a construction by bending the end of the feed conductor 21 beside the tapping point downward, but naturally the whip 27 may also be a separate conductor coupled to the lower end of the helix by means of soldering or in any other known manner. In the construction according to FIG. 4c the tapping point 23 may be located at the junction of the helix 26 and the whip 27 or, if the whip is a separate conductor, at any other location of the series connection formed by the whip 27 and the helix 26. The combination antenna may also consist of more than two parts. For example, it may have a helix in the middle, with a whip coupled to each end.

The same dimensioning principles that apply to the embodiments of FIGS. 3a and 3b apply to the constructions of FIGS. 4a to 4c. The portion above the tapping point 23 in the antenna element determines one and the portion below it determines the other operating frequency together with the feed conductor. Above we have described constructions where the lower part of the tapped antenna element is shorter than the upper part, but the tapping point can also be moved so high that the antenna element's lower part below the tapping point is longer than the upper part so that the lower operating frequency is determined by the dimensioning of the lower part of the antenna element and the higher operating frequency by that of the upper part of the antenna element.

Figure 5A:
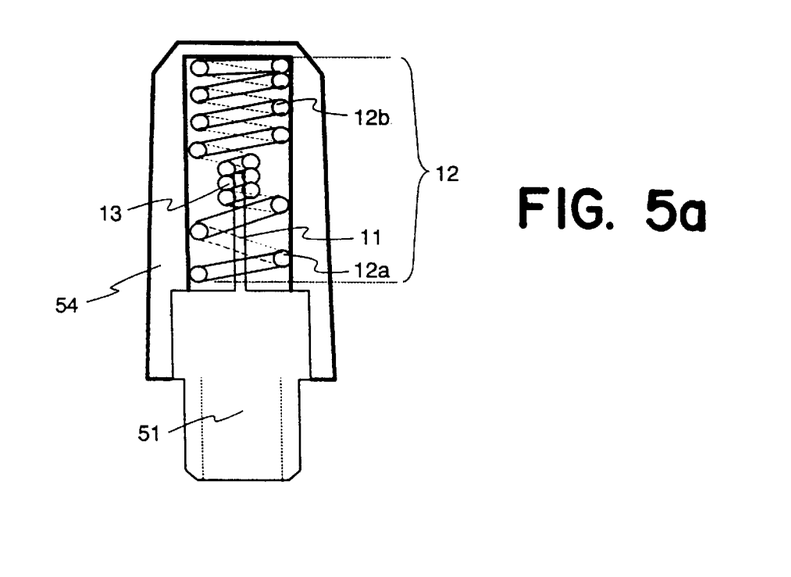
FIG. 5a shows a fifth antenna construction according to the invention.
Figure 5B:
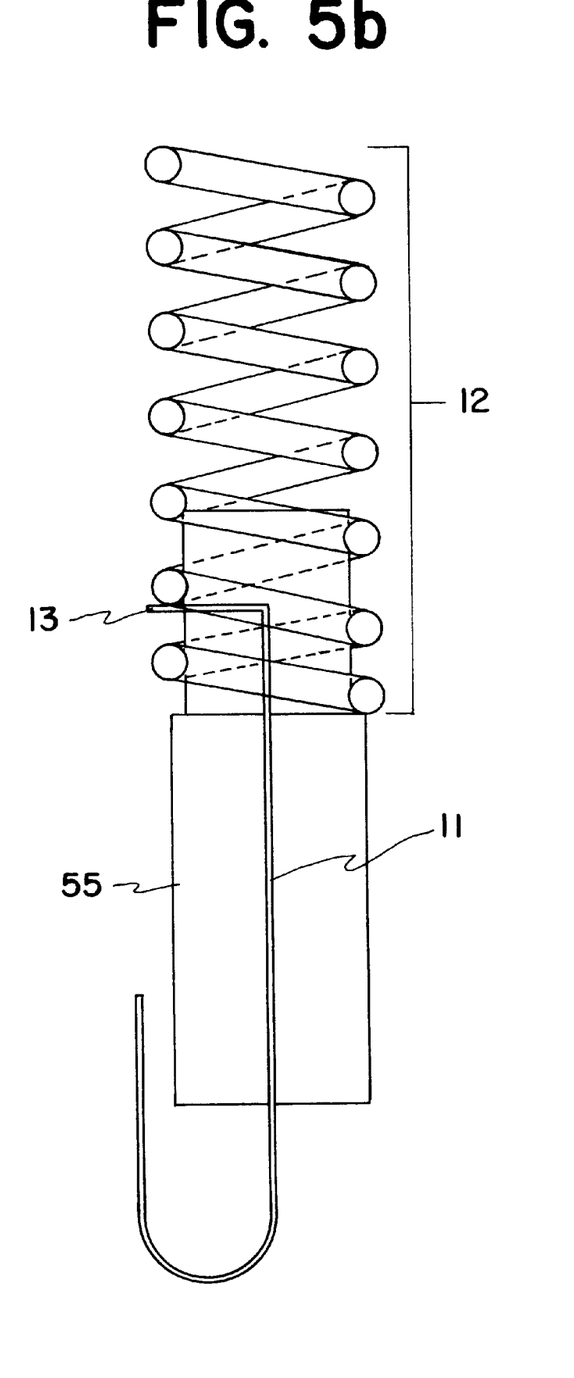
FIG. 5b shows a sixth antenna construction according to the invention.

FIGS. 5a and 5b show some examples for realising the antenna constructions shown schematically in FIGS. 3a to 4c. In FIGS. 5a and 5b the reference designators correspond to FIGS. 3a and 3b where applicable. The antenna of FIG. 5a has a connector part 51 made of a conductive material (preferably metal) the upper part of which enters the helix 12 in the form of a feed conductor 11. The feed conductor 11 may be of the same piece as the connector part 51 or it may be a separate rod-like conductor soldered or otherwise coupled to a hole in the upper surface of the connector part 51, said hole being upright in relation to the position shown. At the tapping point 13 the diameter of the the helix turn is so small that the helix is easily coupled to the upper end of the feed conductor 11 either by friction, soldering or some other known means. In addition, FIG. 5a shows a shield 54 made of an insulating material formed in a known manner on top of the antenna construction to protect it and to give the antenna its final appearance. The lower part of the connector part 51 has threads or some other attachment design (such as snap-on lugs) for the mechanical and electrical coupling of the antenna to the radio apparatus.

FIG. 5b shows a second alternative for realising a coupling between the antenna and the radio apparatus. A feed conductor 11 is bent at the end facing the radio apparatus into a U-form so that electrical coupling to the antenna port (not shown) in the radio apparatus is realised through a spring force in the bent conductor. A supporting part 55 made of an insulating material serves as a mechanical support for the construction and mechanically connects the antenna to the radio apparatus. The present invention does not restrict the coupling between the antenna and radio apparatus, but the coupling can be realised in any known manner.

Figure 6A:
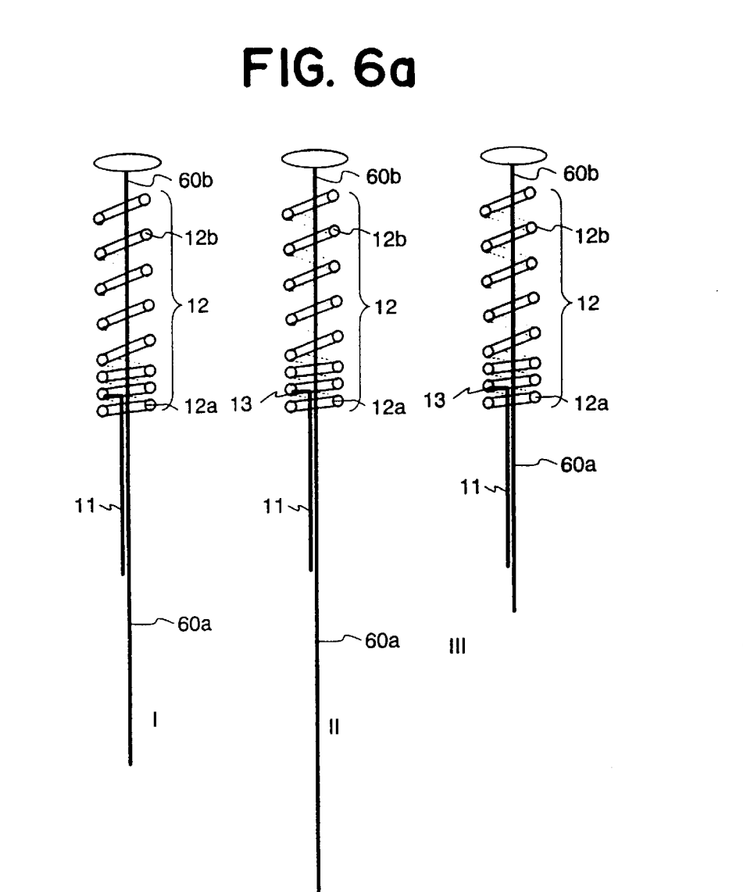
Figure 6B:
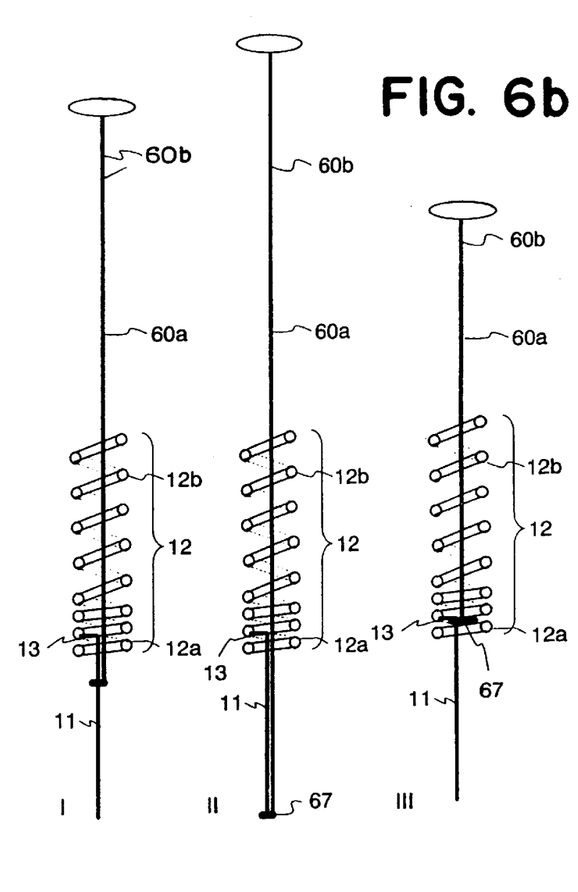
FIG. 6b shows antenna constructions according to the invention with the movable part pulled out.

FIGS. 6a and 6b show three variations of an antenna construction which, in addition to the embodiment of the invention illustrated in FIG. 3b, use a movable whip antenna that can be pulled out from or pushed into the radio apparatus by the user. The variations I, II and III differ in the length of the conductive portion of the movable whip antenna and in the length of the extension connected to it and made of an insulating material. FIG. 6a shows variations I, II and III with the movable whip antenna pushed in, and FIG. 6b shows the same variations with the movable whip antenna pulled out.

The movable whip antenna comprises a conductive portion 60a and a portion 60b made of an insulating material. The latter usually also includes a knob or other shaped part at the upper end which the user can easily grip in order to move the antenna. The conductive portion 60a is preferably dimensioned such that when the movable whip antenna is in its extended position according to FIG. 6b the electrical length measured from the lower end of the feed conductor 11 via the coupling point 67 to the upper end of the conductive portion 60a of the movable whip antenna equals the electrical length from the lower end of the feed conductor 11 via the tapping point 13 to the upper end of the upper part 12b of the antenna element. Then the effective operating frequency of the series connection formed by the feed conductor 11 and the conductive portion 60a of the movable whip antenna is identical to the lower operating frequency of the antenna construction, which means that at the lower operating frequency both the conductive portion 60a of the movable whip antenna and the upper part 12b of the tapped antenna element function as antennas. The lower part 12a of the tapped antenna element functions at the higher operating frequency of the construction as described above.

The length of the conductive portion 60a of the movable whip antenna determines the location at which it is coupled to the feed conductor 11 in the extended position. FIG. 6b shows that the longer the conductive portion 60a, the lower the coupling point 67 to the feed conductor 11. FIGS. 6a and 6b also illustrate how far down (into the radio apparatus) the movable whip antenna goes in its pushed-in position. The conductive portion of the movable whip antenna is at its shortest in variation III where it enters the radio apparatus only for a short distance. In variation II the movable whip antenna extends quite far into the radio apparatus, and variation I is an intermediate form between these two. Also the length of the portion 60b made of an insulating material affects the penetration of the movable whip antenna: the longer the insulating portion, the farther the whip antenna goes in. The length of the insulating portion can be used to determine how much the conductive portion of the movable whip antenna disturbs the operation of the tapped antenna element when the former is pushed in. A long insulating portion means the conductive portion is pushed wholly out of the near field of the tapped antenna element (variation II), and a short insulation portion means the conductive portion is largely left in the near field of the tapped antenna element (variation III). The length of the conductive portion of the movable whip antenna and the length of the insulating portion are in no way related to each other.

Solutions in which the movable whip antenna enters the radio apparatus only for a short distance are especially suitable for small radio apparatuses. On the other hand, when the conductive portion is pushed wholly out of the near field of the tapped antenna element, the latter functions better as an antenna. Although FIGS. 6a and 6b show only a certain embodiment for realising, a tapped antenna element, it is obvious that the tapped antenna element may constitute any above-described antenna element type or an antenna element type derived from the same inventive idea by means of variation. The movable whip antenna may also be dimensioned for an operating frequency other than that of either portion of the tapped antenna element, so that when the user pulls the movable whip antenna out into the extreme position, he will get a third operating frequency range in addition to the two operating frequency ranges provided by the tapped antenna element.

The present invention also covers constructions in which the tapped antenna element is other than a helix, whip or a combination of those. Several prior art antenna element types are known which correspond to a helix antenna and whip antenna and which can be used as parts of the antenna construction according to the invention. For example, conductive patterns formed on the surface of a printed circuit board or other dielectric medium can be easily shaped such that they serve as tapped antenna elements in the same way as the helix, whip and combination antennas discussed above. Also the movable antenna element in the constructions according to FIGS. 6a and 6b can be any known equivalent of the whip antenna.

From the manufacturing standpoint the antenna construction according to the invention is particularly advantageous because its dimensioning to different combinations of operating frequencies is simple. A manufacturer can produce for all possible combinations of operating frequencies identical antenna preforms in which both the feed conductor and the tapped antenna element are overlong. Adaptation to specific frequencies only requires that the ends of the feed conductor and the tapped antenna element are cut at predetermined points. The present invention is not limited to any particular application but can be used in antennas in different applications and at different frequencies, advantageously at radio frequencies such as UHF and VHF. The construction is advantageously applied to mobile phone antennas.

What is claimed is:

1. A dual-band antenna construction functioning as two quarter-wave length antennas comprising a feed conductor (11, 21) and a first radiating antenna element (12, 22, 24, 25, 26, 27), said first radiating antenna element having a first end and a second end, characterized in that the feed conductor is substantially electrically unshielded and serves as a radiator together with said first radiating antenna element and is coupled to the first radiating antenna element at a tapping point (13, 23) which is located between said first end and second end, and which divides the first radiating antenna element into two parts having unequal electrical lengths, said first radiating antenna element having a common unidirectional physical characteristic immediately before and after said tapping point.

2. The antenna construction of claim 1, characterised in that first radiating antenna element is a cylindrical coil conductor (12).

3. The antenna construction of claim 2, characterised in that said cylindrical coil conductor includes at the tapping point a portion which is wound more tightly than the rest of the cylindrical coil conductor and to which an end of the feed conductor is coupled.

4. The antenna construction of claim 1, characterised in that first radiating antenna element is a straight conductor (22).

5. The antenna construction of claim 1, characterised in that first radiating antenna element is a conductive pattern formed on the surface of a dielectric medium.

6. The antenna construction of claim 1, characterised in that first radiating antenna element is a series connection formed by a cylindrical coil conductor (24, 26) and at least one straight conductor (25, 27).

7. The antenna construction of claim 6, characterised in that the tapping point (23) is located at the junction of said cylindrical coil conductor (26) and said at least one straight conductor (27).

8. The antenna construction of claim 6, characterised in that the tapping point is located between the ends of said cylindrical coil conductor (24).

9. The antenna construction of claim 1, characterised in that it additionally comprises a second radiating antenna element (60*a*) which can be moved in relation to said first radiating antenna element.

10. The antenna construction of claim 9, characterised in that said second radiating antenna element is a whip element that can be moved along its longitudinal axis in relation to the first radiating antenna element between a first extreme position and a second extreme position.

11. The antenna construction of claim 10, characterised in that in said first extreme position the whip element is coupled (67) to said feed conductor so that the electrical length of the series connection formed by the feed conductor and the whip element is substantially the same as the electrical length of the series connection formed by the feed conductor and one of the unequally-long portions of said first radiating antenna.

\* \* \* \* \*

UNITED STATES PATENT AND TRADEMARK OFFICE
CERTIFICATE OF CORRECTION

PATENT NO.   : 6,140,973
DATED        : October 31, 2000
INVENTOR(S)  : Petteri Annamaa et al.

It is certified that error appears in the above-identified patent and that said Letters Patent is hereby corrected as shown below:

Foremost page, [56] Please add,

--U.S. PATENT DOCUMENTS

| | | | |
|---|---|---|---|
| 5,374,937 | 12/1994 | Tsunekawa et al. | 343/702 |
| 5,451,966 | 09/1995 | Du et al. | 343/715 |
| 5,079,558 | 01/1992 | Koike | 343/702 |
| 5,838,285 | 11/1998 | Tay et al. | 343/895 |
| 5,512,914 | 04/1996 | Hadzoglou et al. | 343/816 |
| 5,990,848 | 11/2000 | Annamaa et al. | 343/895--. |

Signed and Sealed this

Nineteenth Day of June, 2001

Attest:

*Nicholas P. Godici*

NICHOLAS P. GODICI
*Attesting Officer*   *Acting Director of the United States Patent and Trademark Office*